United States Patent [19]

Okunishi et al.

[11] 4,166,521
[45] Sep. 4, 1979

[54] STAINLESS STEEL BRAKE DISC STRUCTURE

[75] Inventors: Hiromu Okunishi, Saitama; Hideki Nakaji, Kawagoeshi; Hiroyuki Suwa, Saitama; Hideaki Sato, Kawagoeshi, all of Japan

[73] Assignee: Honda Giken Kogyo Kabushiki Kaisha, Tokyo, Japan

[21] Appl. No.: 767,341

[22] Filed: Feb. 10, 1977

[30] Foreign Application Priority Data

Feb. 17, 1976 [JP] Japan .............................. 51-16783[U]
Apr. 2, 1976 [JP] Japan .................................. 51-36732
Apr. 17, 1976 [JP] Japan .................................. 51-43964

[51] Int. Cl.$^2$ ........................................... F16D 69/02
[52] U.S. Cl. ................................. 188/251 M; 148/37;
188/73.2; 188/218 XL; 192/107 M
[58] Field of Search .......... 188/73.2, 218 XL, 251 M;
192/107 M, 107 R; 148/37

[56] References Cited

U.S. PATENT DOCUMENTS

| | | | |
|---|---|---|---|
| 2,199,096 | 4/1940 | Berglund | 148/37 X |
| 2,627,325 | 2/1953 | Helsten | 188/264 A X |
| 3,243,019 | 3/1966 | Lallemant | 188/218 X L |
| 3,301,356 | 1/1967 | Pompa | 188/218 X |
| 3,393,775 | 7/1968 | Hollins | 188/218 X L |

FOREIGN PATENT DOCUMENTS 677144 8/1952 United Kingdom ................ 188/218 R
816169 7/1959 United Kingdom ................ 188/251 M

OTHER PUBLICATIONS

*Wrought Stainless Steels*, Metals Handbook, 8th Edition, American Society for Metals, Cleveland, 1961, p. 409.
*Stainless and Heat Resisting Steels*, Steel Products Manual, American Iron and Steel Institute, Washington, D. C., 1974, p. 148.

*Primary Examiner*—George E. A. Halvosa
*Attorney, Agent, or Firm*—Irving M. Weiner; Pamela S. Austin; Melvin Yedlin

[57] ABSTRACT

A brake disk and process for producing the same which is particularly suitable for use on motorcycles. A stainless steel material of particular chromium content is subjected to a heat-treating and press-quenching step to form a brake disk having a sufficient hardness required for the function of a brake and being of favorable appearance for use on motorcycles.

6 Claims, 10 Drawing Figures

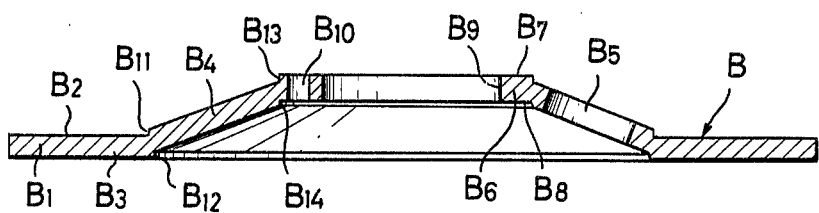
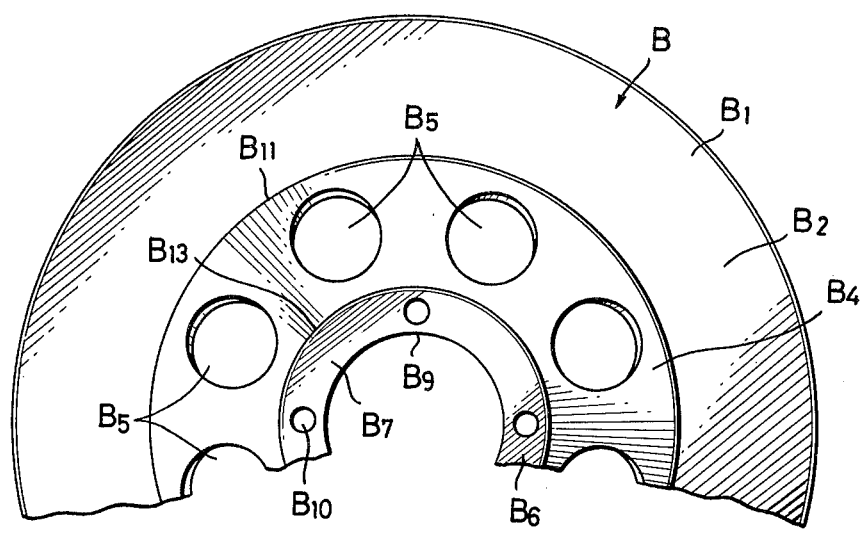
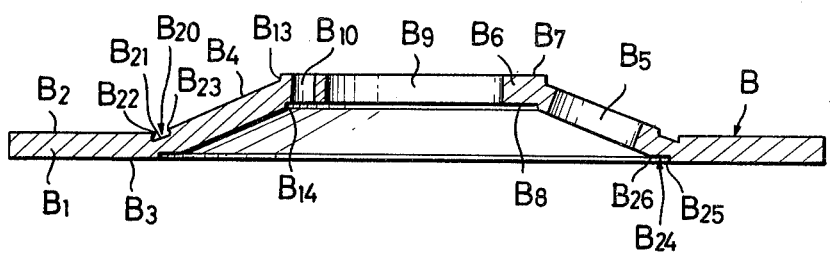

STAINLESS STEEL BRAKE DISC STRUCTURE

The present invention relates to brake disks to be used for vehicles, such as autobicycles or motorcycles, and processes for producing the same.

More particularly, the present invention relates to a brake disk having various desireable characteristics such as high corrosion resistance, good braking performance, silence, and parallelism and flatness of an annular disk portion, and to a process for producing brake disks at a high productivity by reasonable producing steps.

BACKGROUND OF THE INVENTION

The disk type brake is so high in stability at high speeds and under high loads as to be highly practical, not only for use with automobiles but also for motorcycles.

When a disk brake is employed for use on an autobicycle or motorcycle, the brake disk will be exposed on the outside of the wheel, as compared to a disk brake of an automobile. Therefore, the material of the disk should have various optimum characteristics associated with a brake disk, as well as having high corrosion resistance and favorable appearance. Therefore, a stainless steel material is used for such brake disks. In considering the characteristics of such stainless steel material used for brake disks, the brake performance depends on the friction coefficient of the surface of the material, i.e., the hardness and smoothness of the surface. If the hardness is too high, excessive slippage will result. If the hardness is low, excessive friction and wear will result. A squeaking sound of the brake may result from excessive hardness.

In the brake disk made of such stainless steel material and the process for producing the same, the performance of the brake disk is influenced by its hardness. In the prior art, the stainless steel plate material is generally first heated to 1050° to 1150° C. and quenched to obtain a material of HRC (a Rockwell hardness on the scale C) of about 50 to 53. Then it is annealed at about 650° C. to reduce the hardness to HRC of 30 to 40, to obtain a brake disk of a required hardness. Particularly, the annular disk portion surface which is a brake pad sliding surface is treated to be of HRC of about 32 to 36, considering requirements for brake performance and subsequent machining.

Thus, as described hereinabove, the heat-treating process commonly presently employed to obtain brake disks is that of heating a material to be perfectly within an austenitic range, maintaining it in a heated state, quenching it to obtain a martensitic structure, and further annealing it to decompose the martensitic structure to obtain a carbide-sorbite structure.

In the above conventional means of obtaining brake disks, because the stainless steel material is once quenched and is then annealed, there will be increased distortions caused by the heat-treating steps. Also, even if a press-quenching means is adopted at the time of quenching to increase precision, a strain will be generated in the next annealing step, and poor precision in flatness and parallelism of the annular disk portion surface, which is a brake pad sliding surface, will be obtained. Further, in a disk in which an annular disk portion and wheel hub fitting portion are integrally shaped, there will be distortion generated on the whole, and the precision will be reduced. Therefore, such machining as cutting work will be required after shaping, and the production of brake disks will be troublesome and complicated. Also, mechanical working apparatus will be required and personnel will be required for the work. The producing steps will increase, there will be tool problems, etc., and the cost of the brake disk will of necessity be high. Further, because cutting work is required, it is necessry initially to make the material thicker. Thus, such steps will be disadvantageous to the production with respect to material and especially in shaping a thick material. Further, the annealing temperature range of 650° to 750° C. is so narrow that the above-mentioned required hardness will be difficult to obtain. Even in this respect, there are production problems such as in temperature control, etc.

In addition to the above, in the event that the above-mentioned brake disk is integrally press-shaped, a resilient returning action or springing back of the press-shaped material will occur in the bent shaped portion. Therefore, in particular, parallelism of the pad sliding surface will be difficult to obtain. Thus, the above-mentioned cutting work will be required for its correction. It is difficult to perfectly machine and correct a distorted annular disk surface, and, if the parallelism of the annular disk portion surface is not maintained at high precision, an uneven contact will be produced between it and the brake pad sliding surface. As a result, defects, such as uneven wear, will be produced on the annular disk portion surface, which is a braking surface of the brake disk. Also, uneven wear will be produced on the pad sliding surface of the brake calipers, and the braking efficiency will thus be reduced. Ultimately, the performance of the brake will be reduced, and the durability will also be influenced detrimentally.

SUMMARY OF THE INVENTION

The above-mentioned disadvantages caused by quenching and annealing are eliminated by the present invention. The present invention provides a process for obtaining favorable brake disks without passing through the conventional steps. In accordance with the present invention, a brake disk of a hardness meeting requirements for good brake feel, wear-resistance, corrosion-resistance, and quietness is obtained by one heat-treating step. A martensitic stainless steel material containing more than 10% chromium is heated to be in a heating range from which a hardness required for a brake disk is obtained directly, and press-quenching it. Thus, the production of brake disks is greatly enhanced by the present invention, and a brake disk favorable in performance can be economically produced at a high productivity.

A primary object of the present invention is to provide a brake disk which is obtained by required minimal steps or simple convenient steps. A brake disk can therefore be produced reasonably and inexpensively, with excellent brake performance, high wear-resistance, high corrosion-resistance, a squeaking brake sound as low as possible, and excellent appearance, performance, quality and precision.

Particularly, an object of the present invention is to provide a brake disk obtained by providing a hardness required for the function of a brake to a martensitic stainless steel plate material containing more than 10% chromium.

A further object of the present invention is to provide a brake disk made to have a surface hardness required for the function of a brake by integrally press-shaping an annular disk portion on the outer periphery of the brake disk, a cylindrical portion connected with the inner periphery of the annular disk portion, and a hub fitting portion connected with the inner periphery of the cylindrical portion and press-quenching them at the time of the shaping.

Therefore, an object of the present invention is to provide an integrally shaped brake disk practically favorable in performance and also favorable in anticorrosion and appearance.

Another object of the present invention is to provide a brake disk made by providing step portions in the boundary portion of the annular disk portion with the cylindrical portion and the boundary portion of the cylindrical portion with the hub fitting portion in the integrally shaped brake disk, preventing the generation of springing back and which is excellent in parallelism and flatness to thereby improve various performances of the brake disk.

A further object of the present invention is to provide a brake disk made by making only an annular disk portion by press-quenching the material to be of a hardness required for the function of a brake and shaping it and integrally combining a separately shaped hub fitting member with the annular disk portion.

Another main object of the present invention is to provide a process for producing brake disks wherein brake disks favorable in performance and high in quality can be produced inexpensively in quantities at high productivity by simple and convenient producing steps.

Particularly, an object of the present invention is to provide a process for producing integrally shaped brake disks wherein the brake disk can be produced by one heat-treating step while maintaining the flatness and parallelism of the annular disk portion at a high precision by hot-press-shaping the material and simultaneously imperfectly quenching it.

Another object of the present invention is to provide a process for producing brake disks by hot-press-shaping and simultaneously continuously imperfectly quenching only the annular disk portion of the brake disk and then combining a separately shaped hub fitting member with the annular disk portion.

A further object of the present invention is to provide a process for producing brake disks wherein, as a brake disk is shaped through one heat-treating step of press-shaping and imperfectly quenching it as mentioned above, a brake disk high in precision and quality will be obtained by a simple convenient step requiring no subsequent machining, or having a minimum work attached to it without such deformation or strain as in the case of annealing the brake disk. Further, because it is not annealed, the heat-treating step will be simplified, the difficult control and setting of the annealing temperature will not be required, the temperature control will be simple and easy, and the heat-treating step will be simplified.

More particularly, the producing process of the present invention provides brake disks of a predetermined shape by heating a martensitic stainless steel plate material containing at least 10% chromium to be at an imperfectly quenching temperature set so that a hardness required for a brake disk is obtained, and press-quenching the heated material.

In the press-shaping, as the material is press-shaped, punched and press-quenched while held and pressed, a brake disk having excellent flatness, parallelism and precision can be obtained. This is possible not only in an integrally shaped type brake disk, but also in a brake disk of a type made by separately shaping an annular disk portion and hub fitting member and then combining them.

A preferred embodiment of the present invention shall be explained in detail in the following with reference to the accompanying drawings.

BRIEF DESCRITION OF THE DRAWINGS

FIG. 4 illustrates a magnified sectioned view of the brake disk depicted in FIG. 3.

FIG. 5 depicts a plan view of the essential portion of the integrally shaped brake disk depicted in FIG. 4.

FIG. 6 illustrates a sectioned side view showing a modification of the brake disk shown in FIG. 4.

DETAILED DESCRIPTION OF PREFERRED EMBODIMENTS

The material to be used for a brake disk in accordance with the present invention is a stainless steel plate material containing at least 10% chromium (hereinafter referred to as Cr) and having a predetermined surface and thickness precision. The content of Cr is defined to be more than 10% because, if the content of Cr is less than 10%, the brake disk will not have a practical anticorrosion capacity nor a desirable bare exposed appearance for use on a motorcycle.

Figure 9:
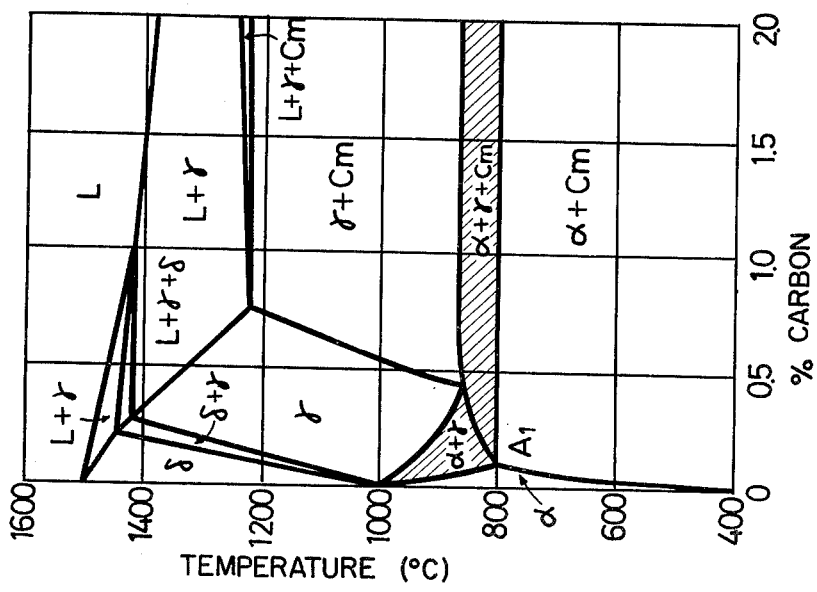
FIG. 9 illustrates an Fe-Cr-C (Iron-Chromium-Carbon) state diagram of a stainless steel material of 12% chromium-carbon.

The above-mentioned material is heated and held at a particular temperature in a temperature range set by a hardness required for a brake disk above the transformation point $A_1$ shown in the Fe-Cr-C state diagram of FIG. 9. Shaping and punching steps, such as edging, drawing, and boring the material, are completed while the material is held and pressed with a press. Simultaneously, the material is continuously held and pressed and is quenched to be of a predetermined hardness. In FIG. 9, the horizontal axis represents carbon content in percentage, and the vertical axis represents temperature in °C.

It should be noted that if the above-mentioned steel plate material is quenched under a temperature condition lower than the conventional general quenching temperature condition, that is in, the range of the transformation point $A_1$ zone of $\alpha+\gamma$(ferrite+austenite) and $\alpha+\gamma+Cm$ (ferrite+austenite+cementite) in the Fe-Cr-C state diagram, a mixed structure of the martensite+ferrite+cementite or ferrite+martensite will be obtainable. Therefore, the predetermined hardness mentioned above is obtained by controlling the hardness to be proper at HRC of 30 to 45 proper for a brake disk with the amount of austenite at the time of heating it, i.e., with the heating temperature at which no later annealing will occur.

The above described quenching is generally called an imperfect quenching. According to the present invention, a martensitic stainless steel plate material containing at least 10% Cr is edged, drawn and bored with a press and is simultaneously imperfectly quenched as mentioned above or imperfectly quenched by press-quenching to obtain a product of HRC of 30 to 45 optimum for brake disks.

In the above, the material is press-shaped and quenched or the shaped product is only quenched to directly obtain a predetermined hardness of the brake disk and therefore no subsequent annealing step is required. Thereby, no strain will be generated and the precision of the product will be maintained under a preset condition.

Figure 10:
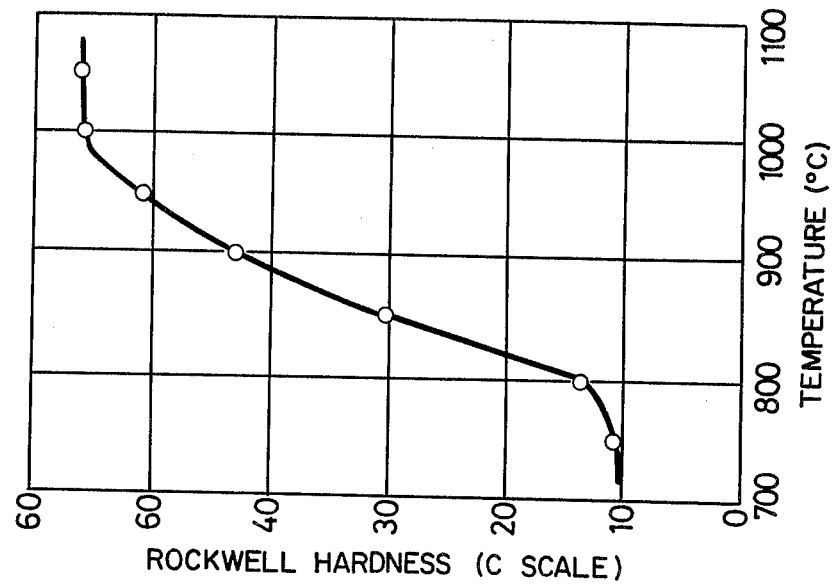
FIG. 10 depicts a diagram showing relations between the quenching temperature and HRC (Rockwell hardness of the scale C) of a stainless steel material of 12% chromium-0.3% carbon.

FIG. 10 shows relations between the quenching temperature and hardness in a stainless steel fabricated of 12% Cr-0.3% C. As evident in this graph, the higher the quenching temperature, the higher the hardness. Also as shown in the graph, as the stainless steel of 12% Cr-0.3% C is quenched generally at 920° to 980° C., the quenched hardness will be HRC of 46 to 56 which is not desirable for a brake disk. Therefore, as mentioned above, it must be annealed to be of a controlled hardness adapted to a brake disk.

Therefore, the temperatures above the transformation point $A_1$ in the Fe-Cr-C state diagram of FIG. 9 comprise a temperature zone set by required hardnesses, because if the material is quenched at a temperature of 850° to 910° C. (lower than the ordinary quenching temperature), a hardness in a range of HRC of 30 to 45 will be obtained. Thus, the hardness will be controlled only by quenching in one step the above-mentioned integrally shaped disk or the like. Consequently, in the process for producing brake disks, only one heat-treating step is required, and a desired hardness can be obtained in this one step. Also, the producing steps can be greatly simplified, and a brake disk having an optimum surface hardness and a brake feeling characteristic required for a brake disk, as well as being high in wear-resistance and anticorrosion, and favorable in appearance is obtained.

Further, when the material is imperfectly quenched while held and pressed with a press, a brake disk high in parallelism and flatness will be obtained and, with only a subsequent grinding work, the above-mentioned brake disk will be obtained.

The above described brake disk and a process for producing the same shall now be explained with an example of the process for producing brake disks according to the present invention being first explained.

Figure 1:
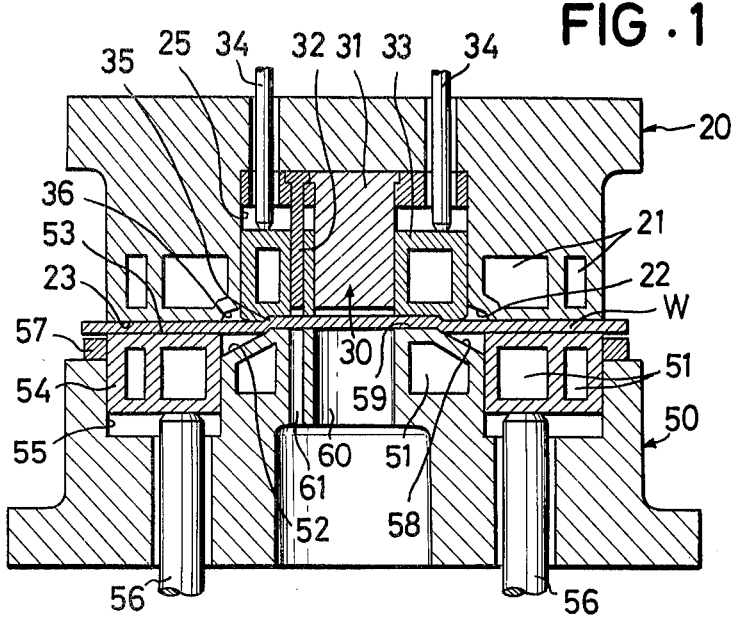
FIG. 1 depicts a vertically sectioned elevational view showing an initial shaping stage with a quenching press for producing an integrally shaped brake disk according to the present invention.
Figure 2:
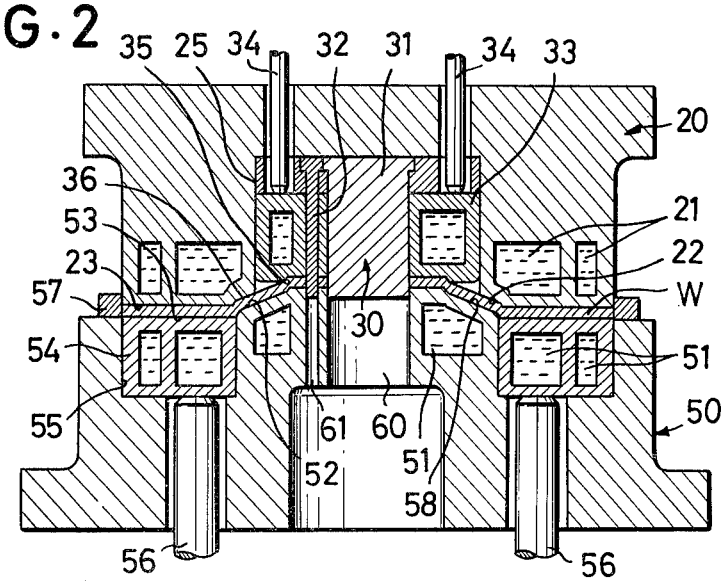
FIG. 2 illustrates a view showing a press-quenching stage with the quenching press of FIG. 1.
Figure 3:
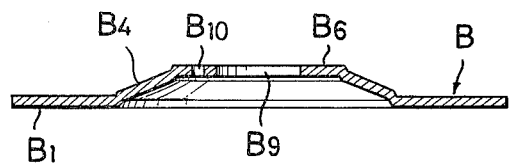
FIG. 3 depicts a sectioned side view of an integrally shaped brake disk obtained in accordance with the present invention.

FIGS. 1 through 3 show the production of a brake disk of an integrally shaped type. A press is provided with cooling water passages 21 and 51 respectively in an upper die 20 and a lower die 50. The upper die 20 and lower die 50 are formed to be ring-shaped, and the upper die 20 is formed to be movable. Drawing shaping portions 22 and 52 are symmetrically formed, with one as a concave portion and the other as a convex portion in the intermediate parts of the opposed shaping surfaces of the respective dies 20 and 50. The lower surface of the peripheral side portion of the upper die 20 is formed to be a ring-shaped flat surface 23. A movable receiving block 54 having a flat upper surface 53 is provided as opposed to the surface 23 of the upper die 20, is vertically movably fitted in a ring-shaped cavity 55 formed in the peripheral portion of the lower die 50, and is supported on the lower surface by stays 56 connected with a plurality of cushion units set as vertically passed through the die. Cooling water passages 51 are provided in the block 54. The outer peripheral end edge of the receiving block 54 and the outer peripheral end edge of the surface 23 of the upper die 20 are so set as to fit each other. A fixed ring-shaped edge-cutting member 57 is provided on the outer periphery of the block 54.

Inside the block 54 of the lower die 50 is a tapered surface 58 of the fixed die formed to be tapered as expanded downwardly. The central portion enclosed with the tapered surface 58 forms a flat central surface 59.

A downwardly opened circular cavity 25 is provided in the central portion of the upper die 20. A boring device 30 including a punch 31 for punching and shaping a hole for inserting an axle, and punches 32 for shaping holes for fitting a hub is fixed and provided in the central portion in the cavity 25. A slidable ring-shaped movable pushing block 33 for drawing and shaping, provided with cooling water passage 21, is fitted on the outer peripheral portion of the above-mentioned punches 31 and 32 within the cavity 25. The upper surface of the block 33 collides with rods 34 of oil pressure cylinders or the like provided vertically through the cavity 25 and outer portion of the upper die 20. A concentric step portion 35 with a diameter larger than that of the central surface 59 of the lower die 50 is provided on the lower surface of the block 33 and a stepped portion 36 is provided on the end edge of a tapered concave surface-shaped drawing and shaping portion 22 provided in the boundary portion of the opening end edge of circular cavity 25 with the flat surface 23.

On the other hand, receiving holes 60 and 61 for receiving the punches 31 and 32 are made in the central portion of the lower die 50.

The production of integrally shaped brake disks with the above described press will now be explained. The above-mentioned martensitic stainless steel plate material W containing more than 10% Cr is heated to be at the imperfectly quenching temperature and is put as heated between the upper and lower dies 20 and 50. The upper die 20 is lowered to hold the central portion of the material W with the lower surface of the block 33 of the upper die and the central surface 59 of the lower die 50 and to hold the outer peripheral portion of the material W with the opposed flat surfaces 23 and 53 of the peripheral portions of the upper and lower dies 20 and 50. With the fall of the upper die 20, only this portion will be pressed down by the stepped portion 35 on the inside diameter side of the lower surface of the block 33 more than the other portions to form a stepped portion. The upper die 20 will fall while the peripheral portion of the material W is strongly held and pressed by the flat surfaces 23 and 53. With the fall of the upper die 20, while holding the peripheral portion of the material W, the receiving block 54 of the lower die 50 will fall against the pressure of the stays 56 and the outer peripheral portion of the material W will be cut off by the edge cutting member 57 provided in the outer peripheral portion to determine the dimension of the outside diameter of the material W.

Further, with the fall of the upper die 20, the material W held and pressed in the peripheral portion and central portion will be drawn and shaped in the intermediate portion and will be plastically deformed and pressed by the stepped portion 36 on the outside diameter side in the boundary portion of the outer peripheral portion with the tapered intermediate portion to be drawn and shaped. Also, it will be perfectly held by the above-mentioned stepped portion 35 and the stepped portion 36 in the outer peripheral portion and central portion, and will be drawn and shaped only in the intermediate portion without slipping.

Simultaneous with the fall of the upper die 20, the punches 31 and 32 will also fall to punch and shape an axle inserting hole and hub fitting holes in the central portion of the material.

The thus edged, drawn, punched and shaped material W as held is quenched by feeding cooling water through the cooling water passages 21 and 51 to attain a predetermined hardness to obtain a shaped product shown in FIG. 2. The shaped product is then mechanically worked, such as by grinding, on both surfaces of the annular disk portion, and is painted on the hub fitting surface to obtain the brake disk shown in FIG. 3.

FIG. 3 shows a sectioned side view of the above obtained brake disk B. FIG. 4 shows a magnified view of the brake disk B for convenience of explanation. The brake disk B is provided with an annular disk portion $B_1$ of the outer peripheral portion, a tapered cylindrical portion $B_4$, a hub fitting portion $B_6$ in the central portion parallel with the disk portion $B_1$. An axle inserting hole $B_9$ and hub fitting holes $B_{10}$ are formed in hub fitting portion $B_6$. A hole $B_5$ for weight reduction and decoration is formed in the cylindrical portion $B_4$ in the embodiment of FIGS. 4 and 5 can be shaped by attaching a shaping punch to the press. As the brake disk B is press-shaped and quenched as mentioned above while continuously held and pressed in the respective steps, the parallelism and flatness over the entire peripheries of both front and rear surfaces $B_2$ and $B_3$ of the annular disk portion $B_1$ can be set and maintained at a very high precision. Further, because no annealing is carried out, the initially set parallelism and flatness can be obtained without requiring any special mechanical work. Further, because both front and rear surfaces $B_7$ and $B_8$ of the hub fitting portion $B_6$ in the central portion are shaped and quenched also while held and pressed, parallelism with the annular disk portion $B_6$ can be maintained nearly perfectly. When drawing and shaping the cylindrical portion $B_4$ in the above, the boundary portions of the annular disk portion $B_1$ and hub fitting portion $B_6$ will be bitten and held in the stepped portions 36 and 35 of the upper die 20, the material will not slip, and the axle inserting hole $B_9$ and hub fitting hole $B_{10}$ will be prevented from being deformed.

FIG. 4 is magnified to clearly show the stepped portions formed in the brake disk B. In the boundary portions of both surfaces of the cylindrical portion $B_4$ with both front and rear surfaces $B_2$ and $B_3$ which are pad sliding surfaces of the annular disk portion $B_1$, and the boundary portions of both front and rear surfaces $B_7$ and $B_8$ of the hub fitting portion $B_6$ with both surfaces of the cylindrical portion $B_4$, slight stepped portions $B_{11}$, $B_{12}$ and $B_{13}$, $B_{14}$ are respectively formed in the axle fitting direction in the direction vertical to the surfaces $B_2$, $B_3$ and $B_7$, $B_8$. The stepped portions $B_{11}$, $B_{12}$ and $B_{13}$, $B_{14}$ are formed over the entire peripheries of the annular boundary portions and are shaped in the shaping step in the above described press. The stepped portions $B_{11}$, $B_{12}$ and $B_{13}$, $B_{14}$ are formed in the same direction vertical to the flat surfaces $B_2$, $B_3$ and $B_7$, $B_8$ on both front and rear surfaces of the boundary portions. The heights of the stepped portions vary slightly depending upon the type and thickness of the material. The heights of the stepped portions $B_{11}$, $B_{12}$ and $B_{13}$, $B_{14}$ form steps and cause a plastic deformation vertical to the surface portion of the material structure in those portions, deform the structure over the deformation elastically recovering limit in the portions, maintain a sufficient continuity in the central portion of the structure, and maintain a sufficient strength without impairing the strength of the product.

When the stepped portions $B_{11}$, $B_{12}$ and $B_{13}$, $B_{14}$ are formed, an effective plastic deformation will be produced in the structure of the surface portion of each of those portions of the brake disk B. Therefore, in the hub fitting portion $B_6$ and annular disk portion $B_1$ connected above and below the sloped cylindrical portion $B_4$ and parallel with each other, even if the brake disk is all integrally press-shaped, the springing back usually generated in each boundary portion with the cylindrical portion $B_4$ which is a drawn shaped portion will be absorbed by the step shaping and, at the time of separating the upper and lower dies 20 and 50, no springing back will occur. Therefore, the parallelism and flatness of the front and rear pad sliding surfaces $B_2$ and $B_3$ of the annular disk portion $B_1$ and of the front and rear surfaces $B_7$ and $B_8$ of the hub fitting portion $B_6$ will be maintained at a high precision.

Thus, a brake disk which is very high in parallelism, flatness, precision, and performance is obtained by providing the stepped portions together with the above mentioned material, hot press-shaping, and imperfect quenching while held and pressed.

FIG. 6 shows a modification of the stepped portion. At the time of integrally shaping the disk, a cavity $B_{20}$ is made in the form of a ring over the entire periphery of the boundary surface on the opposed surface side to the surface on the axle fitting side of the ring-shaped boundary portion of the cylindrical portion $B_4$ with the annular disk portion $B_1$. This cavity $B_{20}$ has a small width in the direction of the cylindrical portion $B_4$, the peripheral surface $B_{22}$ on the annular disk portion side of the cavity $B_{20}$ is formed to be vertical to the sliding surface $B_2$, and the peripheral surface $B_{23}$ on the cylindrical portion $B_4$ side is formed to be parallel with the peripheral surface $B_{22}$.

On the surface opposed to the cavity $B_{20}$ of the annular disk portion $B_1$ and cylindrical portion $B_4$, a recessed stepped portion $B_{24}$ is formed to be recessed to the axle fitting side vertically to the pad sliding surface $B_3$ of the surface and is slightly deflected in the direction of the inside diameter from the inner peripheral surface $B_{22}$ of the cavity $B_{20}$. The peripheral edge $B_{25}$ on the outer peripheral side of recessed stepped portion $B_{24}$ is formed to be perpendicular with respect to the surface $B_3$ and the top surface $B_{26}$ is formed to be parallel with the surface $B_3$ in the direction of the inside diameter and is connected with the surface in the same inclined direction of the cylindrical portion $B_4$. The cavity $B_{20}$ and recessed stepped portion $B_{24}$ are integrally shaped at the time of shaping and can be easily worked by modifying the dies. The cavity $B_{20}$ and recessed stepped portion $B_{24}$ are provided so as not to impair the strength of the part forming them. The stepped portions $B_{13}$ and $B_{14}$ are provided between the cylindrical portion $B_4$ and hub fitting portion $B_6$.

In the embodiment of FIG. 6, as the brake disk is integrally shaped by providing the cavity $B_{20}$ and recessed stepped portion $B_{24}$ on both front and rear surfaces between the annular disk portion $B_1$ and cylindrical portion $B_4$, a sufficient plastic deformation will be given to the surface of the material structure and the springing back produced in the integrally shaped brake disk will be eliminated to a greater extent than in the aforementioned embodiment.

FIGS. 1 through 6 show embodiments of integrally shaped type brake disks. In the embodiment of FIGS. 1 and 2, the edge of the material is simultaneously cut off but a material cut to be of a predetermined outside diameter may be used. Further, the material may be shaped to be of the shape of a brake disk in advance, heated as mentioned above, punched with a press, and quenched.

In the above, cooling water passages are provided in the dies for quenching. However, a system such as spraying cooling water from outside can also be adopted.

An integrally shaped disk and process for producing the same are explained in the above. The present invention also includes a brake disk made by shaping a hub fitting portion and disk portion while divided and integrally assembling and securing them through rivets or the like, and a press for producing the same in such manner as is shown in FIGS. 7 and 8.

Figure 7:
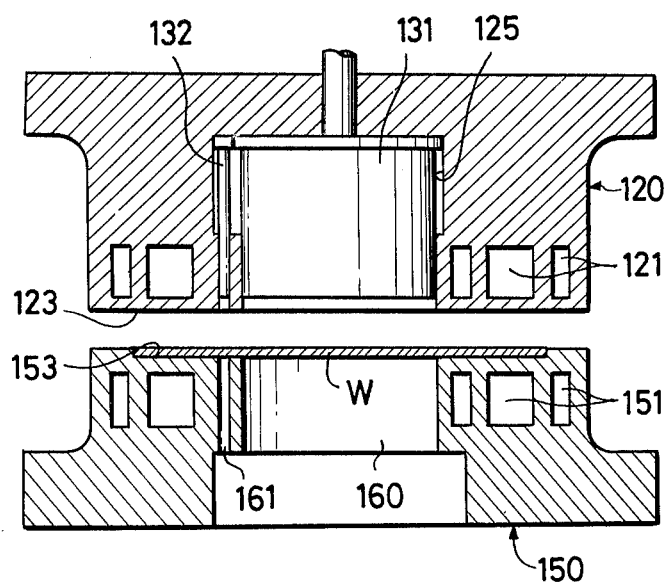
FIG. 7 depicts a vertically sectioned view of a quenching press showing an initial shaping state of a type made by separately shaping an annular disk member and hub fitting member before assembly thereof.
Figure 8:
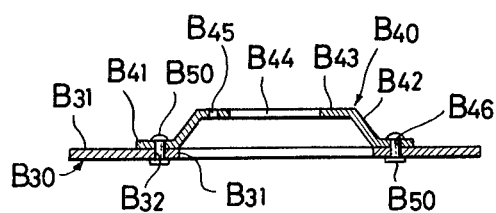
FIG. 8 illustrates a sectioned side view of the brake disk obtained in accordance with FIG. 7.

FIG. 7 shows a quenching press wherein the upper die 120 is a movable die provided with cooling water passages 121 in the peripheral portion, a die surface 123 formed to be flat on the peripheral side, and a punch 131 for shaping an axle inserting hole and punches 132 for shaping hub fitting member riveting holes movably provided in a cavity 125 formed to open downwardly in the central portion. The lower die 150 is a fixed die provided with opposed cooling water passages 151 in the same manner as is mentioned above, a recessed die surface 152 for receiving a disk material W fitted as half immersed on the die surface and holes 160 and 161 for receiving the punches 131 and 132 in the central portion.

Martensitic stainless steel plate material W containing more than 10% Cr is cut to be disk-shaped of a predetermined outside diameter dimension, is heated to be at the imperfectly quenching temperature, and is then put between the die surfaces of the upper die 120 and lower die 150 as shown in FIG. 7. The upper die 120 is then lowered to hold and press the peripheral portion of the material and the punches 131 and 132 are lowered in this state to punch and shape the material. While the material remains held and pressed as it is, cooling water is fed through the cooling water passages 121 and 151 to imperfectly quench the material. The quenched ring-shaped disk member $B_{30}$ (FIG. 8) will have an axle inserting hole $B_{31}$ formed in the central portion and holes $B_{32}$ for riveting a hub fitting member $B_{40}$ formed on the peripheral side of axle inserting hole $B_{31}$. Aside from the annular disk member $B_{30}$, there is prepared a hub fitting member $B_{40}$ provided with a flange portion $B_{41}$, tapered cylindrical portion $B_{42}$, hub fitting portion $B_{43}$, axle inserting hole $B_{44}$, hub fitting holes $B_{45}$, and riveting holes $B_{46}$ formed in the flange portion $B_{41}$. The hub fitting member $B_{40}$ is placed on the annular disk member $B_{30}$ and rivets $B_{50}$ are inserted through the holes $B_{46}$ and $B_{32}$ and are calked to integrally combine both members $B_{30}$ and $B_{40}$ as shown in FIG. 8.

In this embodiment, the material is preset so that the outside diameter dimension may fit and is punched, held, pressed, and imperfectly quenched but may be simultaneously cut on the edge. As there is no drawing shaping, a material cut to be of the outside diameter dimension and having had the axle inserting hole and hub fitting member combining holes formed in advance may be heated and imperfectly press-quenched while held and pressed.

We claim:

1. A brake disk characterized in that it is fabricated substantially of a martensitic stainless steel plate material containing at least 10% chromium and having a suitable surface hardness for a brake, wherein said surface hardness of said martensitic stainless steel plate material is determined by imperfect quenching of said material from a heated temperature within the range of the shaded zone of $\alpha+\gamma$ and $\alpha+\gamma+Cm$ in the accompanying Fe-Cr-C state diagram as shown in FIG. 9.

2. A brake disk according to claim 1, comprising:
an integrally formed outer peripheral annular disk portion;
a cylindrical portion connected with the inner periphery of said annular disk portion; and
a hub fitting portion connected with the inner periphery of said cylindrical portion.

3. A brake disk according to claim 2, wherein:
said annular disk portion and said hub fitting portion are substantially parallel and flat;
a tapered cylindrical portion is provided between said annular disk portion and said hub fitting portion to connect said annular disk portion and said hub fitting portion;
said hub fitting portion has an axle inserting hole formed therein; and
said hub fitting portion has a plurality of hub fitting holes formed therein.

4. A brake disk according to claim 2, wherein a tapered cylindrical portion is provided between said annular disk portion and said hub fitting portion to connect said annular disk portion and said hub fitting portion, said cylindrical portion having holes provided therein.

5. A brake disk according to claim 2, comprising:
an outer peripheral flat annular disk portion;
a tapered cylindrical portion connected to the inner periphery of said annular disk portion;
a flat hub fitting portion connected to the inner peripheral portion of said cylindrical portion and parallel with said annular disk portion;
a first step provided substantially perpendicular to a first flat surface of said annular disk portion in the boundary area between said annular disk portion and said cylindrical portion;
a second step provided substantially perpendicular to a second flat surface, which is opposite said first flat surface, of said annular disk portion in a boundary area between said annular disk portion and said cylindrical portion;
a third step porvided substantially perpendicular to a first flat surface of said hub fitting portion in a boundary area;
a fourth step provided substantially perpendicular to a second flat surface hub fitting portion, opposite to said first flat surface of said hub fitting portion, in a boundary area between said hub fitting portion and said cylindrical portion;

said first, second, third and fourth steps constituting means for preventing spring back of any of said portions of said brake disk.

6. A brake disk according to claim 2, comprising:

an outer peripheral flat annular disk portion;

a tapered cylindrical portion connected to the inner periphery of said annular disk portion;

a flat hub fitting portion connected with the inner peripheral portion of said cylindrical portion and parallel with said annular disk portion;

a first step provided substantially perpendicular to a first flat surface of said hub fitting portion in a boundary area between said hub fitting portion and said cylindrical portion;

a second step provided substantially perpendicular to a second flat surface of said hub fitting portion, opposite said first flat surface of said hub fitting portion, in a boundary area between said hub fitting portion and said cylindrical portion;

a cavity provided in a first surface of a boundary portion between said annular disk portion and said cylindrical portion;

a recessed step portion provided in a second surface of said boundary portion, opposite said first surface of said boundary portion, between said annular disk portion and said cylindrical portion;

said cavity having a first side wall portion which is disposed substantially perpendicular to a first flat surface of said annular disk portion, and having a second side wall portion which is disposed oblique to said tapered cylindrical portion; and said recessed step portion having a side wall disposed substantially perpendicular to a second flat surface of said flat annular disk portion, which is opposite to said first flat surface of said annular disk portion.

* * * * *